(12) United States Patent
Staats et al.

(10) Patent No.: US 12,025,175 B2
(45) Date of Patent: Jul. 2, 2024

(54) ARRANGEMENT WITH AN ADJUSTMENT DEVICE FOR POSITION ADJUSTMENT OF TWO PARTS CONNECTED WITH EACH OTHER

(71) Applicant: Carl Mahr Holding GmbH, Goettingen (DE)

(72) Inventors: Michael Staats, Noerten-Hardenberg (DE); Jens Feldmann, Duderstadt (DE)

(73) Assignee: CARL MAHR HOLDING GMBH, Göttingen (DE)

( * ) Notice: Subject to any disclaimer, the term of this patent is extended or adjusted under 35 U.S.C. 154(b) by 923 days.

(21) Appl. No.: 16/671,344

(22) Filed: Nov. 1, 2019

(65) Prior Publication Data
US 2020/0141433 A1    May 7, 2020

(30) Foreign Application Priority Data

Nov. 2, 2018   (DE) ..................... 10 2018 127 424.6
Nov. 6, 2018   (DE) ..................... 10 2018 127 682.6

(51) Int. Cl.
*F16B 5/02*   (2006.01)
(52) U.S. Cl.
CPC .......... *F16B 5/0258* (2013.01); *F16B 5/0233* (2013.01); *F16B 5/025* (2013.01)
(58) Field of Classification Search
CPC .... F16B 5/0216; F16B 5/0225; F16B 5/0233; F16B 5/025; F16B 5/0258; F16B 43/00; Y10T 403/75

(Continued)

(56) References Cited

U.S. PATENT DOCUMENTS 3,223,374 A * 12/1965 Butler .................. F16B 5/0258
                                                         267/141.4
4,070,120 A    1/1978 Bald et al.
(Continued)

FOREIGN PATENT DOCUMENTS

DE         693854 C      7/1940
DE         725908 C     10/1942
(Continued)

OTHER PUBLICATIONS

German Office Action dated May 13, 2019, in corresponding German Patent Application No. 10 2018 127 682.6, with machine English translation (15 pages).

(Continued)

*Primary Examiner* — Josh Skroupa
*Assistant Examiner* — Kevin J Baynes
(74) *Attorney, Agent, or Firm* — Fitch, Even, Tabin & Flannery LLP

(57) ABSTRACT

An arrangement (20) comprising a first part (21), a second part (22), and an adjustment device (23). The adjustment device (23) includes at least one adjustment unit (24) having a one first sleeve (25) extending in a respective adjustment direction (R) that is connected with the first part (21). At a free sleeve end (27) of the first sleeve (25) an abutment surface (28) is provided. The first sleeve (25) is arranged in a part cavity (26) of the first part (21) and includes a clearance (34) extending in circumferential direction between the first part (21) and the first sleeve (25). Adjacent to the clearance (34) at least one support part (35) is supported at the first part (21) radially to the adjustment direction (R). An adjustment screw (36) can apply a force to the first sleeve (25) to lengthen or compress it in the respective adjustment direction (R).

20 Claims, 9 Drawing Sheets

(58) Field of Classification Search
USPC .................................................. 411/544, 546
See application file for complete search history.

(56) References Cited

U.S. PATENT DOCUMENTS

| | | | | |
|---|---|---|---|---|
| 4,358,098 | A * | 11/1982 | Ceseri | F16B 5/0258 267/141.5 |
| 6,029,942 | A * | 2/2000 | Daddis, Jr. | F04B 39/0044 248/673 |
| 6,280,132 | B1 | 8/2001 | Szczukowski et al. | |
| 6,712,544 | B2 * | 3/2004 | Kruger | F16B 5/0233 411/60.1 |
| 8,202,033 | B2 * | 6/2012 | Choi | B62D 27/065 411/546 |
| 8,987,612 | B2 * | 3/2015 | Callahan | B64D 45/02 174/653 |
| 9,970,196 | B1 * | 5/2018 | Mao-Cheia | E04F 13/145 |
| 10,072,692 | B2 * | 9/2018 | Tsuzuki | F16B 29/00 |
| 2002/0159829 | A1 * | 10/2002 | Kruger | F16B 5/0233 403/374.1 |
| 2008/0095593 | A1 | 4/2008 | McLean et al. | |
| 2011/0209681 | A1 | 9/2011 | Bittner et al. | |
| 2013/0019489 | A1 | 1/2013 | Kummetz et al. | |
| 2015/0308482 | A1 * | 10/2015 | Tsuzuki | F16B 29/00 411/81 |
| 2016/0201703 | A1 * | 7/2016 | Schwarzbich | F16B 5/0233 411/347 |
| 2019/0226507 | A1 * | 7/2019 | Erpenbeck | F16B 41/002 |

FOREIGN PATENT DOCUMENTS

| | | | | |
|---|---|---|---|---|
| DE | 2504183 | A1 | 12/1975 | |
| DE | 2537146 | C3 | 5/1980 | |
| DE | 3328349 | A1 | 2/1985 | |
| DE | 102010045753 | A1 | 9/2011 | |
| DE | 102011079464 | A1 | 1/2013 | |
| DE | 102013110605 | A1 | 4/2014 | |
| DE | 102013209553 | A1 | 11/2014 | |
| EP | 1764516 | A2 * | 3/2007 | ............ F16B 5/0233 |
| GB | 2344136 | A * | 5/2000 | ............ F16B 5/0233 |
| WO | 2011/120268 | A1 | 10/2011 | |

OTHER PUBLICATIONS

British Office Action and Search Report dated Apr. 22, 2020, in corresponding British Application No. 1915604.1 (10 pages).

* cited by examiner

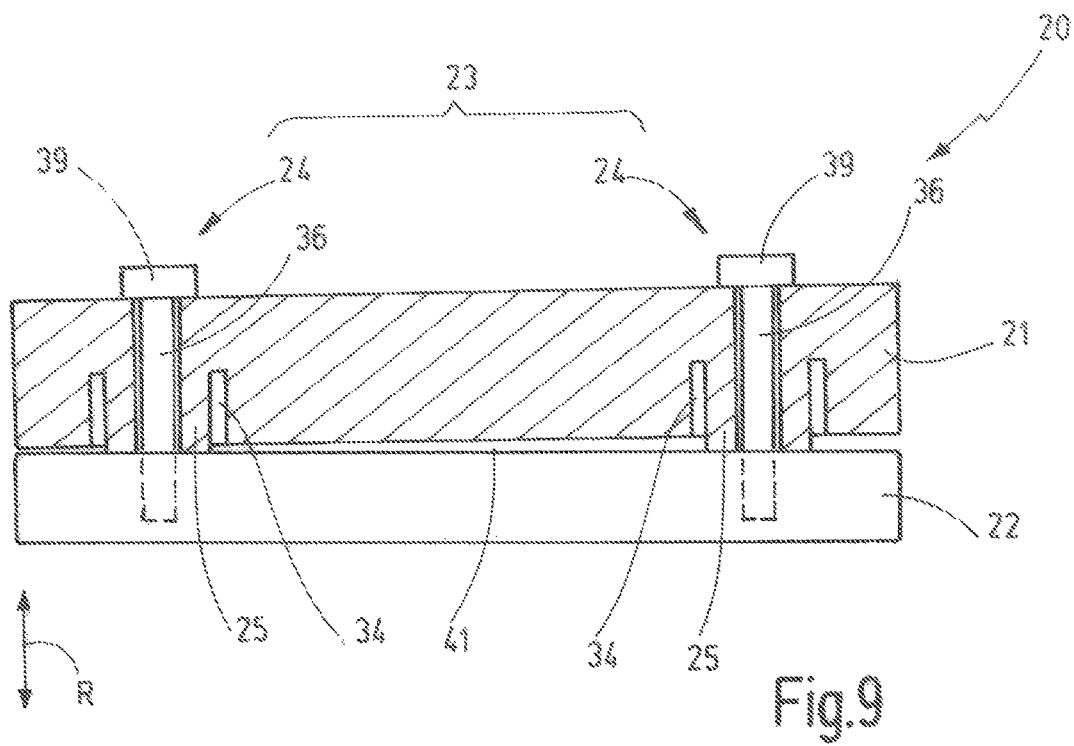
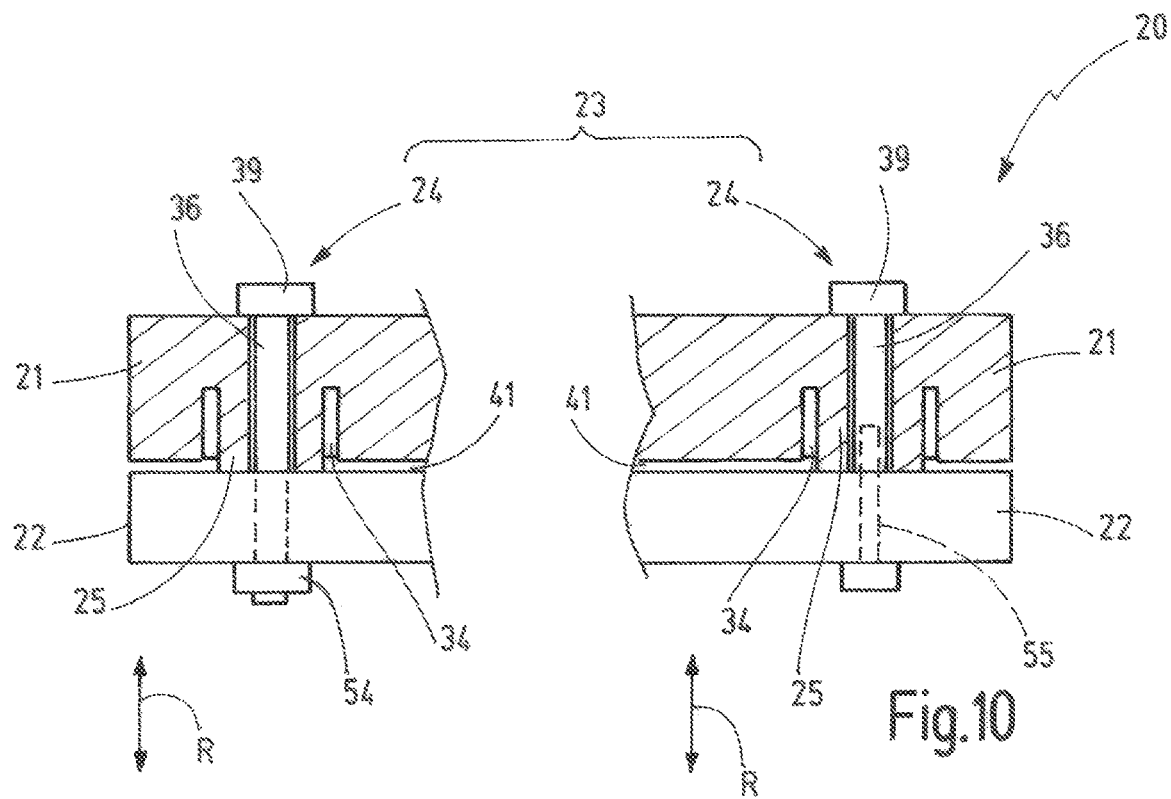

ARRANGEMENT WITH AN ADJUSTMENT DEVICE FOR POSITION ADJUSTMENT OF TWO PARTS CONNECTED WITH EACH OTHER

RELATED APPLICATION(S)

This application claims the benefit of German Patent Application No. 10 2018 127 424.6, filed Nov. 2, 2018, and German Patent Application No. 10 2018 127 682.6, filed Nov. 6, 2018, the contents of which are incorporated herein by reference as if fully rewritten herein.

TECHNICAL FIELD

The invention refers to an arrangement comprising a first part and a second part and an adjustment device for adjustment of the relative position between the first part and the second part. The relative position comprises the position and/or the orientation of these two parts relative to each other.

BACKGROUND

The modification of the relative position between two parts in the context of an assembly of a group of parts, particularly machine axes assembly with a plurality of machine axes, deviations in the relative position between two parts connected with each other due to manufacturing tolerances. If during such an assembly more than two parts are connected with each other, so to say in a stacked arrangement, the tolerances and manufacturing deviations may add and result in remarkable position deviations. In a machine axes assembly regularly stacked axes arrangements are used. Then it is particularly important to achieve the desired relative position between two respective parts connected with each other, in order to avoid positioning deviations at the component moved by means of the machine axes assembly.

The arrangement according to the present invention can particularly be used in measuring devices, in which a contactless or with contact operating probe element is moved relative to a workpiece in order to measure the form, the dimension, the surface roughness or any other characteristic value of the workpiece.

DE 33 28 349 A1 describes a holding device for adjustable instrument portions, e.g. laser mirrors. An integrated hinge is described the inclination of which can be adjusted by means of three adjustment screws.

Additionally, a large number of other documents exist that describe different bolted connections between parts. For example, DE 10 2013 209 553 A1 shows a sleeve-like pressure element that is arranged between the part and a nut during the creation of the bolted connection. By means of the pressure element the elastic lengthening range of the bolted connection shall be increased.

From DE 25 04 183 A1 a bolted connection with low radial stiffness is known. In doing so, the range of a part that is connected by means of a screw with a further part, is cut clear at least partly in a circumferential direction. A similar bolted connection is also described in DE 10 2011 079 464 A1.

In the flanged connection, according to DE 693 854 A, a sleeve is inserted at least between one screw that connects the flanges, wherein the sleeve is supported at the head of the screw or a nut and a cavity in the flange. At this location of the flanged connection the width of the flange is reduced, such that thermal expansions in the direction of the screwed connection have less impact and thus an overall improved bolted connection can be achieved. DE 725 908 A describes a configuration of the described flanged connection, in which the sleeve is integrally formed with one of the flanges.

From DE 25 37 146 C3 a unit of two parts is known that have to be positioned in a relative position. These parts comprise cone-shaped holes at their abutment surfaces that have to be brought into abutment. By means of balls the axes of the conical-shaped holes are aligned relative to each other. In doing so, the relative position between the two parts is defined. Subsequently, the two parts are connected with each other by a bolted connection, wherein the balls can be elastically deformed, such that the abutment surfaces abut against each other after the creation of the bolted connection.

Starting from the prior art an object of the present invention is to create an arrangement with an adjustment device allowing an easy adjustment of the relative position between the parts that have to be connected with each other and that can be easily handled during assembly, service or repair of the arrangement.

SUMMARY

An arrangement comprises a first part, a second part and an adjustment device for adjustment of the relative position between the first part and the second part. The first part and the second part are preferably connected with each other or fixed to each other by means of the adjustment device or by means of other fasteners. Alternatively, the first part or the second part can loosely abut at or on the adjustment device and/or the respective other part.

By means of the adjustment device, the relative position, e.g. the distance, between the two parts and/or the relative orientation of the two parts relative to each other can be adjusted. For example, the two parts can be shifted by means of the adjustment device relative to each other. Additionally or alternatively the adjustment device can define one or more tilting axes or pivot axes around which the two parts can be pivotably adjusted relative to each other.

The adjustment device comprises one or more adjustment units. Each adjustment unit comprises a first sleeve that extends axially in an adjustment direction, the first sleeve being connected with the first part. The connection between the first sleeve and the first part can be integral or can be achieved in any other suitable manner, e.g. by means of form fit and/or force fit and/or material bond connection. The free sleeve end of the first sleeve facing away from the first part has an abutment surface, at which the second part abuts directly or indirectly. The abutment surface defines the position of the second part at the location, at which the first sleeve of the respective adjustment device is present. If a plurality of adjustment units is present, at least one of them can also comprise a first sleeve that is connected with the second part and wherein the first part abuts against the free end of this first sleeve.

At least in a circumferential section about the first sleeve a clearance is present. The circumferential section, along which the clearance extends, is smaller than 360°, particularly smaller then 180°. Thus, each clearance extends in circumferential direction partly about the first sleeve. Adjacent to the at least one clearance at least one supporting part is present at the first part and/or at the first sleeve, such that the first sleeve is supported at the respective circumferential location at the first part by means of the at least one support part. Thus, in the radial directions relative to the adjustment direction, the first sleeve has different bearing rigidities. In the direction of the at least one clearance the bearing rigidity is smaller than in a radial direction, in which the first sleeve is supported at the first part by means of the at least one support part.

The at least one clearance can be open toward the free sleeve end. Alternatively, the at least one clearance can be completely or partly closed toward the free sleeve end, e.g. by means of a connection layer that can be membrane-like configured. The connection layer can also be arranged at a different axial location between the first sleeve and the first part. A clearance that is partly closed and/or divided by means of the connection layer can be created in a simple manner, if the first part and/or the first sleeve is manufactured by means of a 3D printing process. The free sleeve end can have a membrane-like and/or radially supporting effect. Due to the complete closing or partly closing of the clearance or the connection of the first sleeve with the first part, the minimum radial rigidity can be adjusted very well and can be defined, for example, by varying of the layer thickness of the connection layer and/or its axial position.

The at least one support part can have different shapes and is web-shape configured in one embodiment. The at least one support part can be integrally formed with the first sleeve and/or integrally formed with the first part. In the region of the at least one clearance the first sleeve does not contact the first part and the clearance creates a radial distance relative to the adjustment direction between the first sleeve and the first part.

Each adjustment unit has additionally an adjustment screw extending in the adjustment direction that at least partly engages or extends into the first sleeve. Preferably in general an adjustment screw means a bolt that can be moved in an axial direction by means of a rotation around its longitudinal axis, particularly a threaded bolt. The adjustment screw can also intersect the first sleeve completely. The adjustment screw is configured to apply an adjustable force onto the first sleeve. The force acts in parallel to the adjustment direction and can lengthen or compress the first sleeve reversibly in the adjustment direction. The at least one adjustment unit can comprise embodiments, in which the sleeve can only be lengthened, but not compressed. The at least one adjustment unit can comprise embodiments, in which the first sleeve can be compressed, but not lengthened. The at least one adjustment unit can comprise embodiments, in which the first sleeve can be lengthened and compressed.

By lengthening or compressing of the first sleeve the length thereof is changed, such that the distance between the two parts is modified at the location, at which the respective adjustment unit is present. Particularly the force flow in each adjustment unit is locally limited. The force flow is preferably limited in radial direction in the region in which the second part abuts at the abutment surface. Preferably no force is introduced in the parts by means of the adjustment unit radially outside of the first sleeve. If a plurality of adjustment units is present so to speak, multipoint supports can be created between the two parts, such that they can be shifted and/or tilted relative to each other.

Due to the deformation of the first sleeve in axial direction or adjustment direction, transverse share or transverse deformations in radial direction and/or in circumferential direction around the axis are created. These transverse share or transverse deformations in radial and/or in circumferential direction are allowed due to the at least one clearance. In doing so, the adjacent first part is decoupled from the deformations of the sleeve.

In one embodiment of the adjustment unit the first sleeve and the first part can also be configured without a support part. Particularly the only adjustment unit or only one or some of a plurality of adjustment units comprises at least one support part.

The adjustment device comprises only a low number of separate components. During the assembly as well as during maintenance, service or repair the adjustment device can be easily handled. Due to the at least one support part, a sufficient rigidity of the respective adjustment unit can be achieved in one or more radial directions. In doing so, it can be avoided that in directions radial to the respective adjustment direction undesired positioning deviations occur. In the direction of the at least one clearance, radial to the respective adjustment direction, the radial bearing rigidity is reduced compared with the direction, in which the at least one support part is present. A targeted elastic deformation of the first sleeve is allowed in this direction of the at least one clearance, e.g. in order to allow adjustment movements of at least one additional adjustment unit. It is additionally possible to use the adjustment screw of an adjustment unit or the adjustment screws of a plurality of adjustment units also for connecting the two parts with each other, such that the number of required parts is reduced and the creation of the connection between the parts is further simplified.

It is advantageous, if an adjustment gap is present between the first part and the second part at least in the adjustment direction of the respective adjustment unit. By means of the adjustment unit the adjustment gap and thus the distance between the two parts can be modified. The adjustment gap is at least present, if the first sleeve comprises its maximum length in the adjustment direction. After the adjustment of the relative position between the two parts, the adjustment gap can be at least partly closed. It is, however, preferred, if the adjustment gap is dimensioned in a way that it does not decrease to zero in any adjustment condition. In doing so, a sufficient play is present for changing the relative position of the two parts relative to each other and to avoid stresses or deformations of the two parts due to the adjustment.

In one embodiment the two parts abut only indirectly by means of the at least one adjustment unit at each other. In another embodiment a direct contact between the first part and the second part may be present, wherein this contact is configured in a way that it does not impede a relative movement in the respective adjustment direction of the at least one adjustment unit of the adjustment device. For example, a sliding contact between the two parts parallel to an adjustment direction may be present.

In one embodiment of the arrangement a plurality of support parts between the first sleeve and the first part are provided. For example, two support parts can be respectively arranged diametrical opposed to each other relative to the longitudinal axis of the first sleeve. In doing so, the first sleeve is well supported in the first part in the respective radial direction, along which the two support parts of one pair are positioned, wherein the bearing rigidity of the first sleeve is increased in this direction. More than one of such support part pairs may be provided in each radial direction, in which a high bearing rigidity is desired. If in respective radial direction forces do only act in one sense or orientation, instead of a support part pair, only one single support part can be used for increasing the bearing rigidity. The number of the support parts can thus be even or uneven.

In a preferred embodiment the adjustment device comprises more than one adjustment unit. Particularly at least three or exactly three adjustment units can be provided that act in a common adjustment direction. The first sleeves of these adjustment units are orientated parallel to each other at least in a non-deformed initial condition. Preferably the adjustment units acting in a common adjustment direction are in a projection plane orthogonal to the adjustment direction, not arranged along one single straight line, but form a triangle in this projection plane. In doing so, a three-point support of the second part at the first part can be achieved for example.

If a plurality of adjustment units is provided, one adjustment unit or more than one of the present adjustment unit adjustment units can define a tilting axis. The two parts can be tilted or pivoted about this tilting axis relative to each other, particularly by the adjustment using at least one additional adjustment unit. The tilting axis can be defined by one single adjustment unit by arranging of at least one support part along the tilting axis. The first sleeve can draw aside more simply in the direction of the clearances as in the direction of the at least one support part, such that a tilting axis or pivot axis can be defined in this way. Additionally or alternatively the at least one tilting axis can be defined by positioning of two adjustment units along the tilting axis or pivot axis.

If a tilting axis or pivot axis is defined by one or more adjustment units, preferably an additional adjustment unit is provided with distance to the pivot axis or tilting axis. The adjustment direction of this additional adjustment unit extends with regard to the tilting axis or pivot axis, such that a tilting or pivoting about the tilting axis or pivot axis is possible by an adjustment of the at least one adjustment unit. The adjustment direction of this additional adjustment unit, therefore, does not extend parallel to the pivot axis or tilting axis, but e.g. inclined or skewed or orthogonal thereto.

In a preferred embodiment the first sleeve is configured integral with the first part. In doing so, the number of separate parts is reduced. Alternatively the first sleeve can also be connected by a suitable form fit and/or force fit and/or material bond connection with the first part. For example, the first sleeve may comprise an outer thread ring that is screwed in an inner thread at the first part. The at least one clearance and the at least one support part is arranged between the outer thread ring and the first sleeve.

It is additionally advantageous, if a respectively assigned counter-abutment surface is provided at the second part for each abutment surface of a first sleeve. The counter-abutment surface can be provided directly at the second part, such that the second part abuts directly at the at least one abutment surface of the at least one first sleeve.

In another embodiment the at least one adjustment unit can comprise a second sleeve that extends axially in adjustment direction. The second sleeve can be fixed at the second part. The second sleeve can be configured integrally with the second part or can be connected by form fit and/or force fit and/or material bond with the second part. The second sleeve can be similarly configured as one or more of the above described embodiments of the first sleeve. According to the first sleeve, at least one clearance can be present between the second sleeve and the second part and the second sleeve can be supported by at least one support part at the second part. The second sleeve has a free sleeve end having a counter-abutment surface and facing away from the second part. The counter-abutment surface directly abuts at the respective assigned abutment surface of the first sleeve of the same adjustment unit.

Thus, each adjustment unit comprises one or two sleeves. The second part can abut directly at the first sleeve or can comprise a second sleeve alternatively that abuts at the first sleeve.

Preferably the adjustment screw has an outer thread. At least one axially section of the adjustment screw can be configured as threadless section. In one embodiment the threadless section can adjoin the screw head. In another embodiment the threadless section can adjoin the free end of the adjustment screw.

For example the adjustment screw can be supported at one of the two parts and can engage an inner thread at the respective other part or an inner thread at a nut that is supported at the respective other part with the outer thread of the adjustment screw. The adjustment screw can alternatively engage an inner thread at the first part with its outer thread and can press against a counter-stop surface present at the first sleeve with a stop surface that is orientated inclined or orthogonal relative to the adjustment direction. Thus, a pressing force for lengthening or compressing the first sleeve can be applied.

In one embodiment the adjustment screw can comprise two opposed stop surfaces arranged with distance to each other. One counter-stop surface at the first sleeve is assigned to each stop surface. The distance of the stop surfaces in adjustment direction is particularly larger than the distance of the counter-stop surfaces in adjustment direction. In such an arrangement a lengthening or compression of the first sleeve can be created selectively by means of the adjustment screw.

The features disclosed with reference to the adjustment screw and the first sleeve can also be realized in the second part with regard to the second sleeve and an optionally present second adjustment screw. In so far, reference can be made to the above explanations, which can be transferred accordingly on the second part.

BRIEF DESCRIPTION OF THE DRAWINGS

Preferred embodiments of the invention are disclosed in the dependent claims, the description and the drawings. In the following, embodiments of the arrangement are explained in detail with reference to the attached drawings. The drawings show:

DETAILED DESCRIPTION

Figure 11:
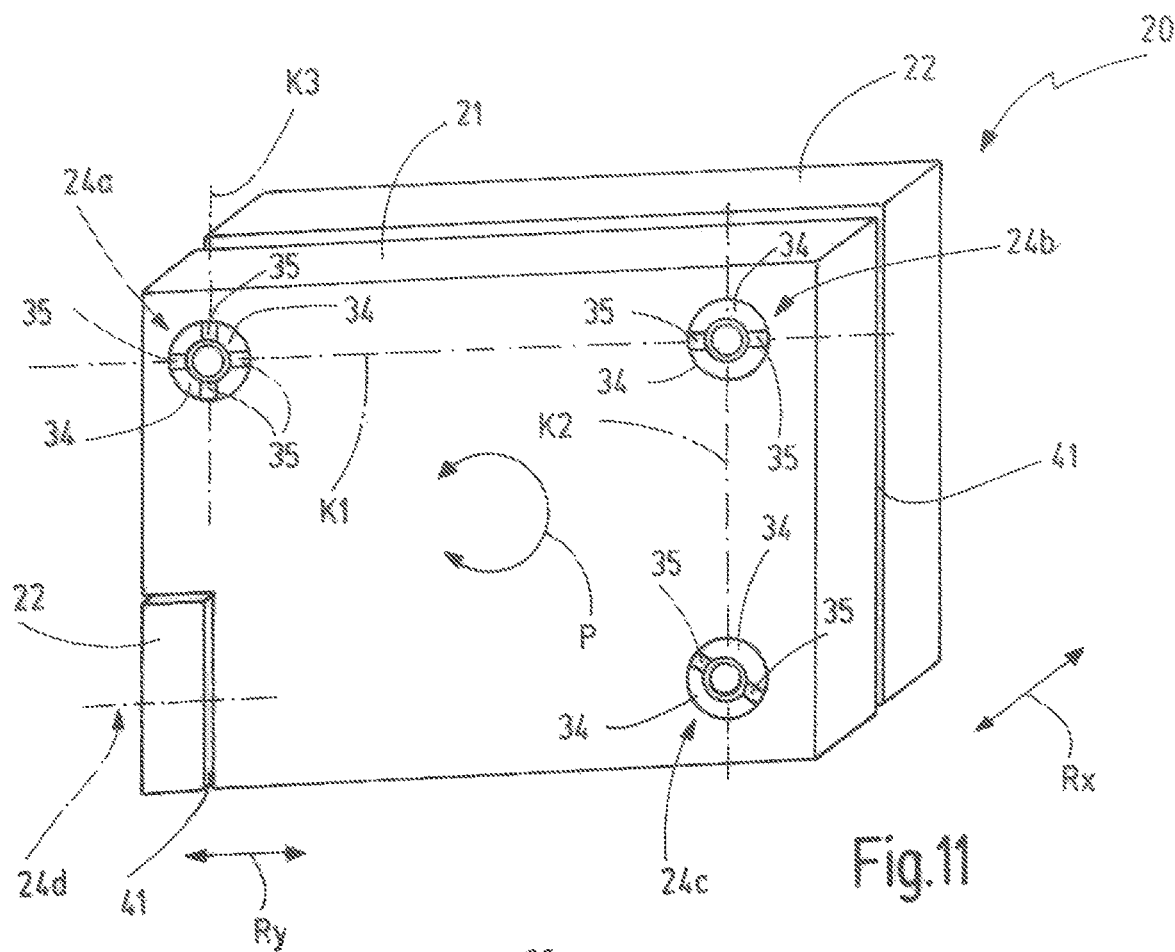

In FIGS. 9-11 embodiments of arrangements 20 comprising a first part 21, a second part 22 and an adjustment device 23 are schematically illustrated. The adjustment device 23 is configured to adjust the relative position between the first part 21 and the second part 22. Preferably the adjustment device 23 is also configured to fix the adjusted position between the first part 21 and the second part 22. The adjustment device 23 is, for example, configured to adjust the relative position between the two parts 21, 22 in at least one translational degree of freedom and/or at least one rotational degree of freedom. For this the adjustment device 23 comprises several adjustment units 24 arranged with distance to each other. If only a translational degree of freedom shall be adjusted between the parts 21, 22, the adjustment device 23 can also comprise only one single adjustment unit 24.

Each adjustment unit 24 serves to adjust the relative position of the first part 21 relative to the second part 22 in a translational degree of freedom in adjustment direction R at the location, at which the adjustment unit 24 is present. If the adjustment device 23 comprises several adjustment units 24 arranged with distance to each other, it is also possible to adjust relative tilts, relative inclinations and thus a relative orientation of the first part 21 relative to the second part 22.

The adjustment units 24 of an adjustment device 23 can have the same configuration. It is also possible that the adjustment device 23 comprises different embodiments of adjustment units 24. Subsequently different embodiments of the adjustment units 24 are explained in detail.

Figure 5:
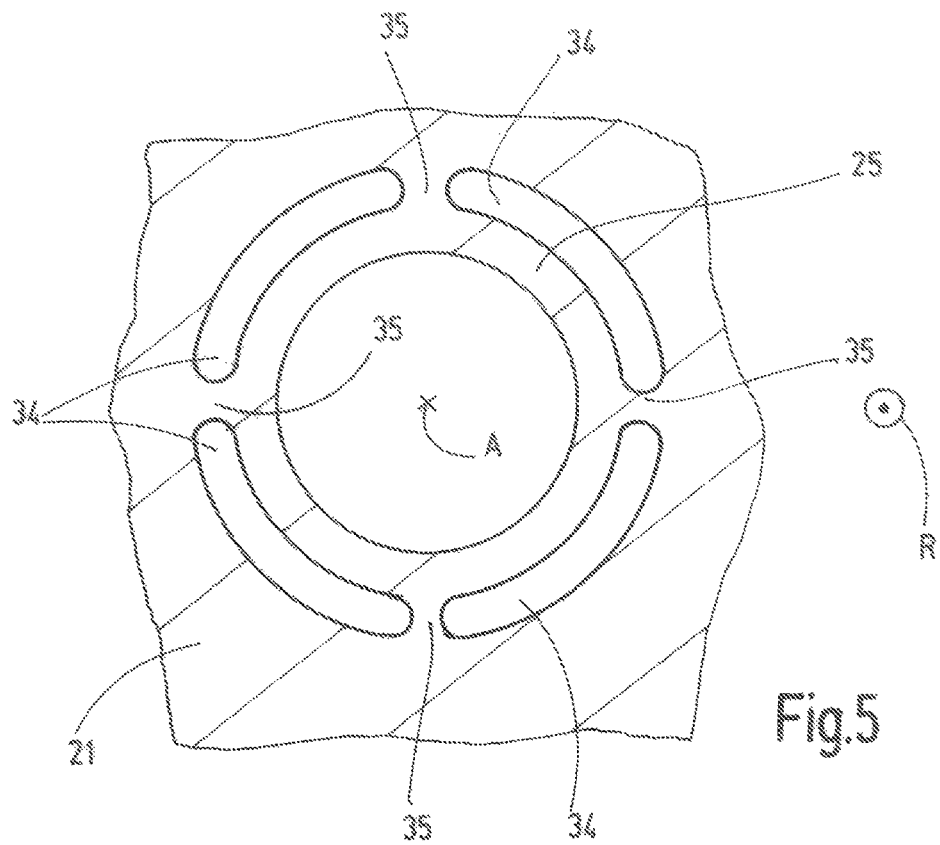
FIG. 5 a schematic top view of a first sleeve or a second sleeve respectively in adjustment direction, FIGS. 6 and 7 additional embodiments of an adjustment unit in length section, FIG. 8 a perspective illustration of a sleeve that is separately configured according to the embodiment of FIG. 7, FIG. 9 an embodiment of an arrangement with an adjustment device having several adjustment units in a schematic sectional illustration, FIG. 10 alternative embodiments of the adjustment units for the arrangement of FIG. 9, FIG. 11 another embodiment of an arrangement in schematic perspective illustration, wherein the adjustment device comprises four adjustment units, FIGS. 12-14 additional embodiments of an adjustment unit in a schematic illustration in a length section respectively, FIG. 15 another embodiment of an adjustment unit in a schematic exploded view, FIGS. 16 and 17 the embodiment of the adjustment unit of FIG. 15 in different operative conditions and FIG. 18 another embodiment of an adjustment unit in a schematic illustration in length section.
Figure 6:
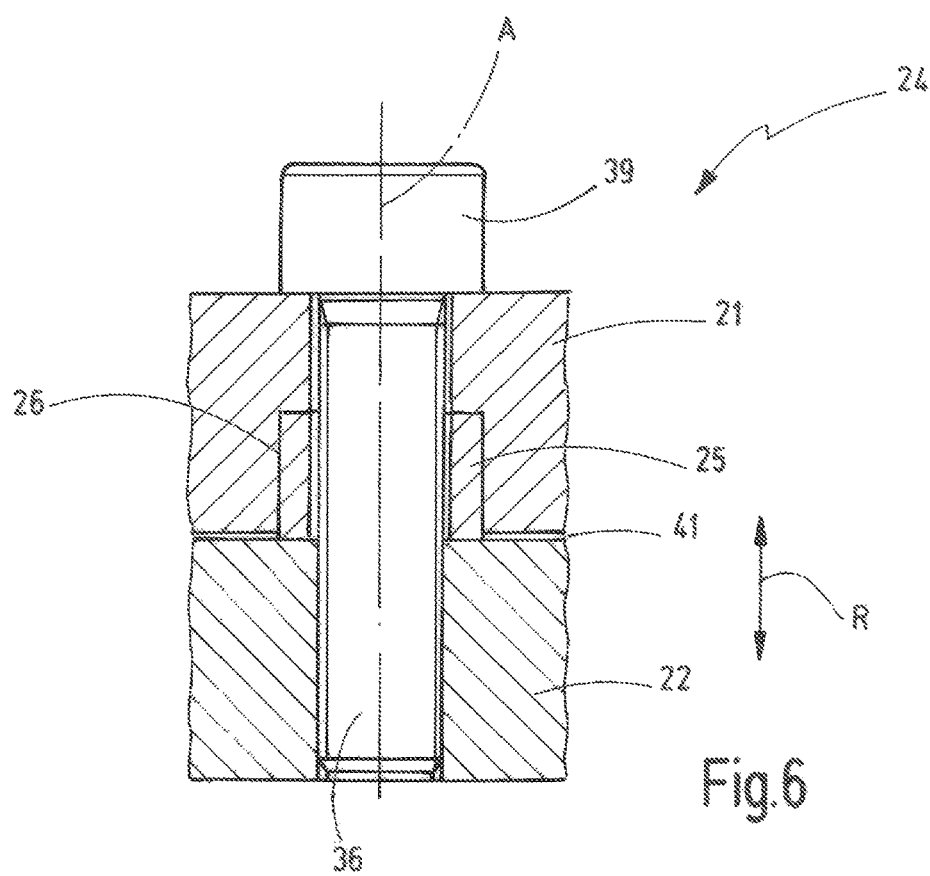
Figure 7:
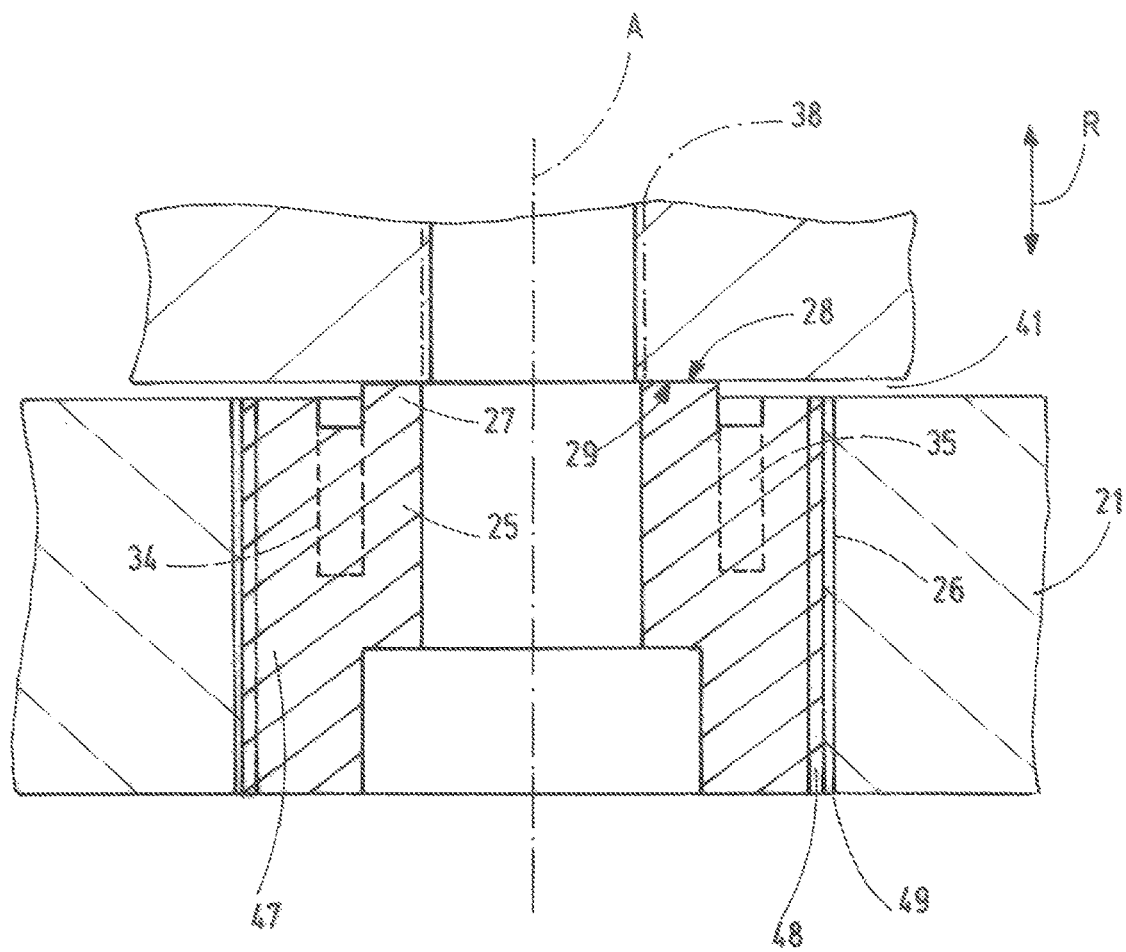
Figure 8:
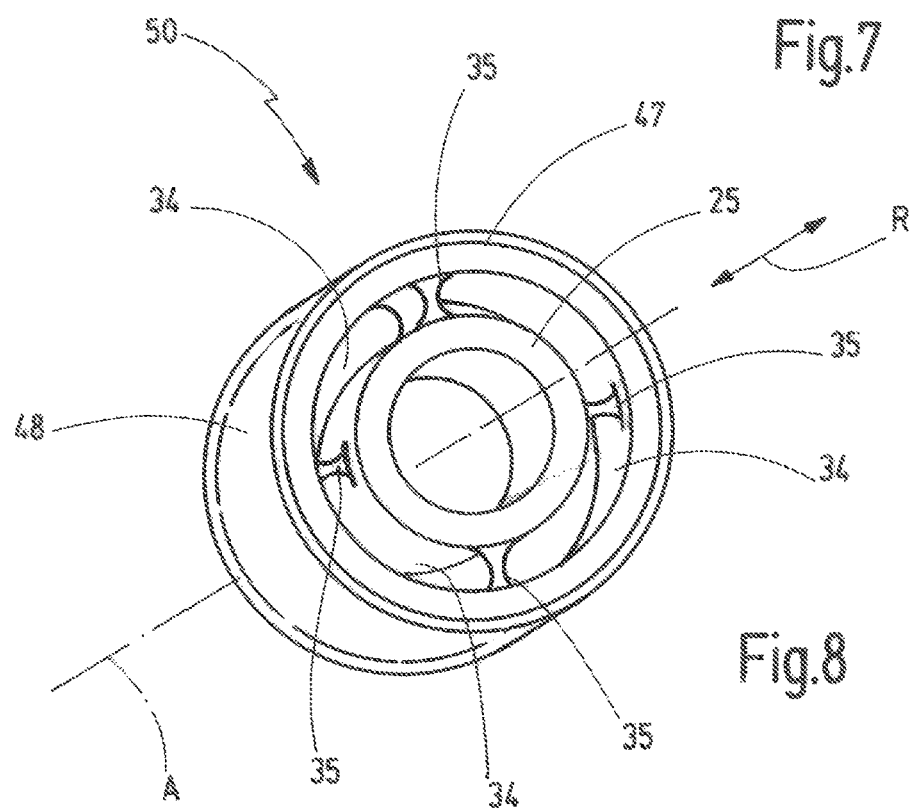

Each adjustment unit 24 comprises a first sleeve 25 that extends coaxially to an axis A in an elastically undeformed condition. This axis A is orientated parallel to the adjustment direction R. The first sleeve 25 is connected with the first part 21. Preferably the first sleeve 25 is integrally formed with the first part 21 (FIGS. 1-5 and FIGS. 9-17). Alternatively, the first sleeve 25 can also be configured as a separate component (FIGS. 6-8). For example, the first sleeve 25 can be connected with a first part 21 by form fit and/or force fit and/or material bond.

The first sleeve 25 is arranged in a first part cavity 26 of the first part 21. According to the embodiments of FIGS. 1-12 and 15-17, a free sleeve end 27 extends out of the first part cavity 26. The free sleeve end 27 faces the second part 22. At the free sleeve end 27 and particularly at the sleeve end face, the first sleeve 25 comprises an abutment surface 28. The abutment surface 28 abuts against a counter-abutment surface 29. The counter-abutment surface 29 can be provided directly at the second part 22 or at a second sleeve 30 (FIG. 3).

Between the first sleeve 25 and the first part 21 a first clearance 34 is present in the first part cavity 26, wherein the clearance 34 extends in circumferential direction about the axis A. The at least one clearance 34 does not extend completely in circumferential direction around the axis A and thus does not form a closed ring space. The at least one clearance 34 is limited in circumferential direction by at least one support part 35 (FIG. 5). The at least one support part 35 supports the first sleeve 25 in a direction radial to the axis A or radial to the adjustment direction R against a relative movement relative to the first part 21. The number of support parts 35 and/or the number of clearances 34 can vary. Each adjustment unit 24 comprises at least one support part 35 and preferably at least two support parts 35. The number of support parts 35 can be even or uneven.

In the exemplary illustrated embodiment of FIG. 5 four clearances 34 and four support parts 35 are provided that are respectively arranged between two directly adjacent clearances 34. In the embodiment the support parts are arranged in pairs. The two support parts 35 of a common pair are positioned diametrically opposed to each other relative to the axis A. In the direction radial to the axis A in that the at least one support part 35 or a pair of support parts 35 supports the first sleeve 25 at the first part 21 the bearing rigidity of the first sleeve 25 is larger than in a radial direction, in which the clearance 34 between the first sleeve 25 and the first part 21 is arranged. In doing so, the bearing rigidity or movability of the first sleeve 25 relative to the first part 21 can be defined in different radial directions radial to the axis A.

Figure 1:
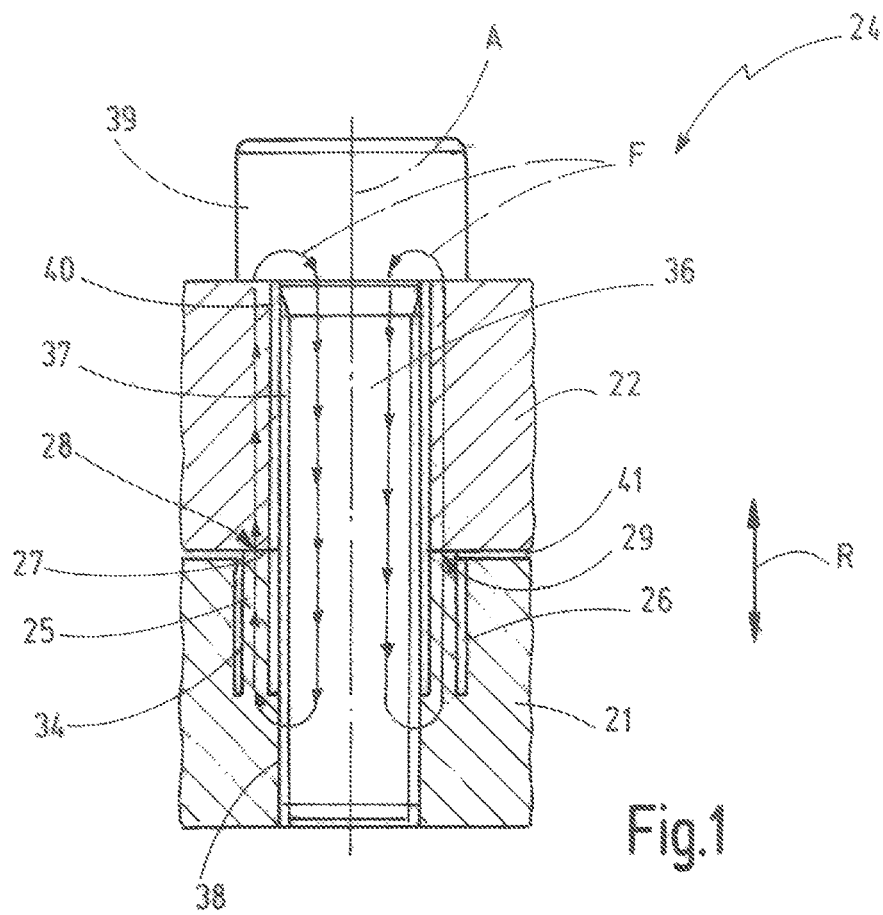
FIGS. 1-4 different embodiments of the adjustment unit in a length section.

Each adjustment unit 24 comprises additionally an adjustment screw 36. The adjustment screw 36 is configured to apply an adjustable force on the first sleeve 25. For this the adjustment screw 36 engages on one hand the first part 21 and on the other hand the first sleeve 25 or the second part 22. In the embodiment shown in FIG. 1 the adjustment screw 36 has an outer thread 37 that is engaged with an inner thread 38 at the first part 21. A head 39 of the adjustment screw 36 is supported at the second part 22. In the embodiment of FIG. 1 a through hole 40 penetrates the second part 22. The head 39 abuts against the second part 22 adjacent to the through hole 40. The inner thread 38 is arranged adjacent to the first sleeve 25 in the first part 21 with view in adjustment direction R or in axial direction. By means of the adjustment screw 36 a pressing force between the second part 22 and the first sleeve 25 can be created. Thus, the first sleeve 25 can be compressed in its axial length.

As it is schematically illustrated in FIG. 1, an adjustment gap 41 is present in adjustment direction R of the adjustment unit 24 between the first part 21 and the second part 22 adjacent to the first sleeve 25. Due to the adjustment gap 41, a sufficient play or space is provided in order to move or position the two parts 21, 22 in adjustment direction R relative to each other by means of the respective adjustment unit 24.

In a preferred embodiment of the arrangement 20 the first part 21 and the second part 22 abut exclusively by means of the at least one adjustment unit 24 against each other and are apart therefrom separated from each other by the at least one adjustment gap 41. Alternatively, the first part 21 and the second part 22 can also directly or indirectly abut against each other at other locations than the at least one adjustment unit 24, as long as the adjustment movement in adjustment direction R of the at least one adjustment unit 24 is not blocked. For example, the first part 21 and the second part 22 can be in contact with each other in a plane that is orientated parallel to the adjustment direction R. If more than one adjustment unit 24 is provided and if not only a translational, but also a rotational relative movement of the two parts 21, 22 relative to each other shall be possible by the adjustment units 24, such a rotational relative movement must neither be blocked.

Also in FIG. 1 a force flow F is schematically shown. As can be seen, the force flow F is limited to the region radially to the axis A, in which the adjustment screw 36 and the first sleeve 25 are present. In other words, the force flow F is limited in radial direction with regard to the axis A to the region in which the first part 21 and the second part 22 abut against each other and the adjustment screw 36. Preferably the first part 21 and the second part 22 are free of any force application that can be created by means of the adjustment screw 36, in a region that is radial to the axis A further away than the abutment surface 28 or the counter-abutment surface 29. The force flow F is exemplarily illustrated in FIG. 1. The local limitation of this force flow applies analogously to the other embodiments of the adjustment unit 24.

Figure 2:
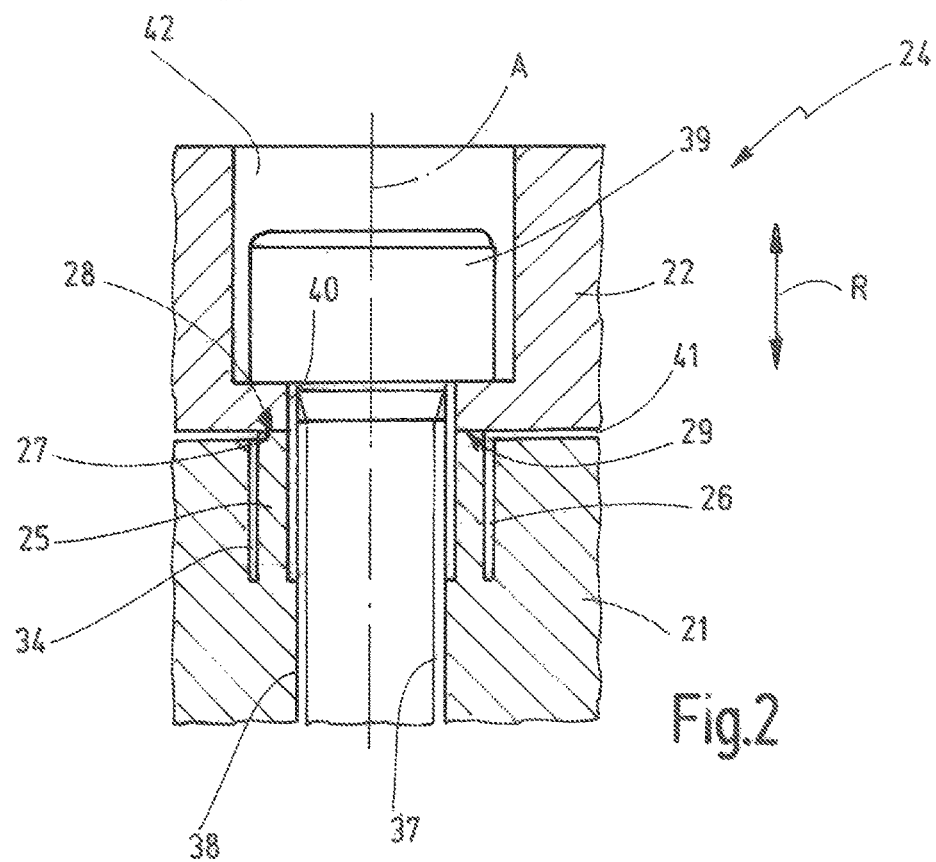
Figure 3:
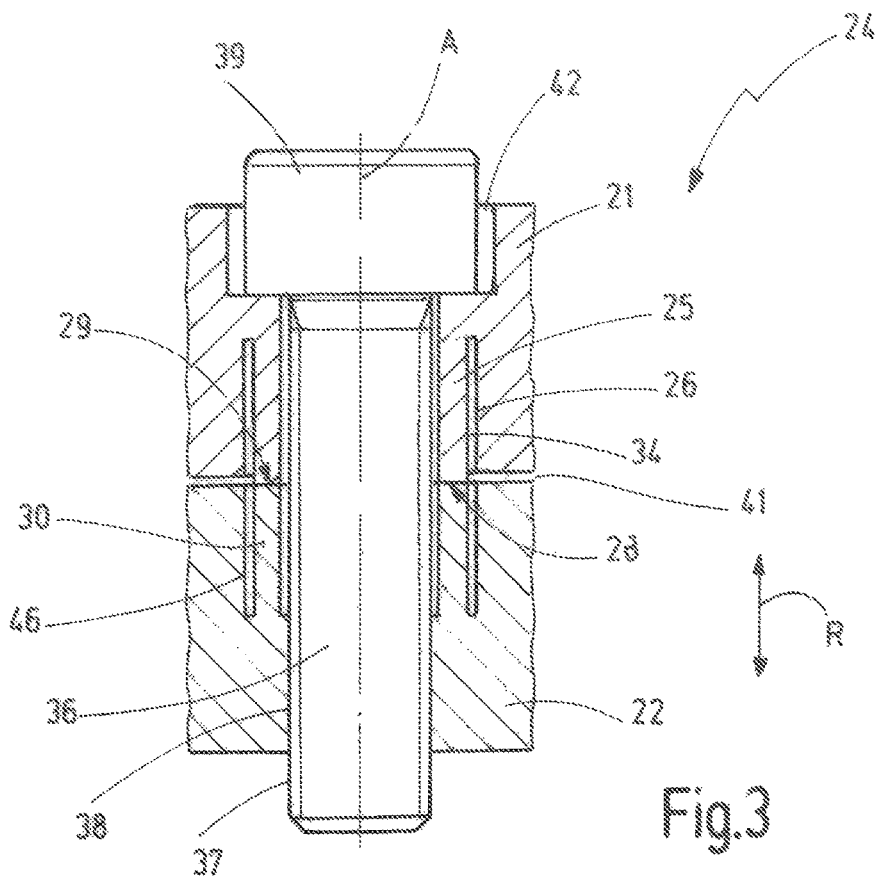

The embodiment of the adjustment unit 24 illustrated in FIG. 2 corresponds mainly to the embodiment according to FIG. 1. Different to the embodiment of FIG. 1, the screw head 39 of the adjustment screw 36 is sunk in the second part 22. For this the second part 22 comprises a diameter extension at the end of the through hole 40 that forms a reception cavity 42 for the head 39. The reception cavity 42 can receive the head 39 completely (FIG. 2) or alternatively only partly (FIGS. 3 and 4).

Figure 4:
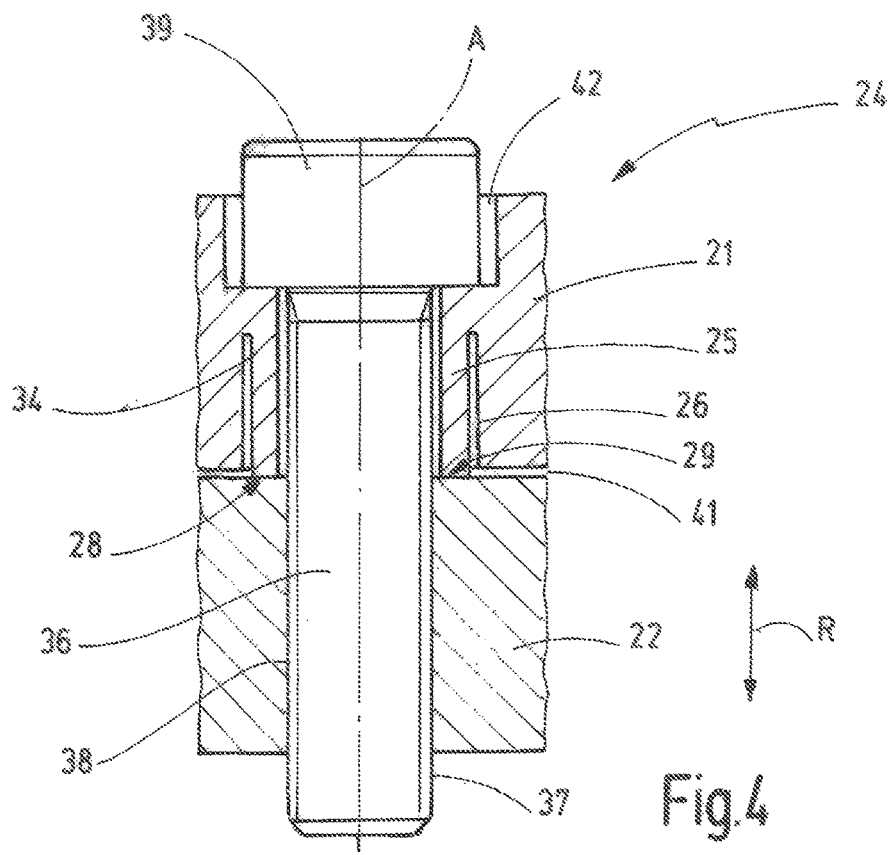

In the embodiments illustrated in FIGS. 3, 4 and 6 the head 39 of the adjustment screw 36 abuts against the first part 21 and can be received completely or partly in the reception cavity 42. The shaft of the adjustment screw 36 passes completely through the first sleeve 25 and engages an inner thread 38 that is provided in the second part 22.

In the embodiment, according to FIG. 3, the second part 22 comprises the second sleeve 30. The second sleeve 30 is connected with the second part 22 and can be configured integrally with the second part 22 or connected by force fit and/or form fit and/or material bond with the second part 22. The second sleeve 30 is arranged in a second part cavity 46. Between the second part 22 and the second sleeve 30 within the second part cavity 46 at least one clearance 34 is present that extends partly in circumferential direction about the axis A of the second sleeve 30. The axis A of the first sleeve 25 and the axis A of the second sleeve 30 coincide in the present embodiment. By means of at least one support part 35 the second sleeve 30 is supported at the second part 22 in a direction radial to the axis A. The arrangement and the configuration of the second part 22 and the second sleeve 30 within the second part cavity 46 can be configured in analog manner compared with the first sleeve 25 and the first part 21, as it is explained above and particularly illustrated in FIG. 5.

As shown in FIG. 3, only the first sleeve 25 extends out of the first part cavity 26, in order to form the adjustment gap 41. Alternatively or additionally also the second sleeve 30 could extend from the second part cavity 46.

In the embodiments shown in FIGS. 6-8 the first sleeve 25 is configured as a separate component and is connected with the first part 21. In the embodiment the connection is preferably created by a form fit and/or force fit by means of a threaded sleeve 47. According to the example, the threaded sleeve 47 comprises a sleeve outer thread 48. The sleeve outer thread 48 can be screwed into a screw-in thread 49 at the first part 21. The screw-in thread 49 is arranged in the first part cavity 26. The threaded sleeve 47 is connected and according to the example integrally connected with the first sleeve 25 by means of the at least one support part 35. The first sleeve 25 and the threaded sleeve 47 form a unit 50 that can be inserted in the first part cavity 26 and can be connected there with the first part 21.

Analog to the embodiments, in which the first sleeve 25 is integrally configured with the first part 21, the first sleeve 25 extends with its free sleeve end 27 from the first part cavity 26, such that the abutment surface 28 is arranged outside the first part cavity 26. In the embodiment the threaded sleeve 47 is arranged with distance to a plane, in which the abutment surface 28 extends and also the threaded sleeve 47 does not intersect this plane. In doing so, the adjustment gap 41 can be formed unimpeded from the threaded sleeve 47 (FIG. 7).

FIG. 10 illustrates additional alternative configuration possibilities for the configuration of the adjustment screw 36 or the screw connection of the two parts 21, 22 at a respective adjustment unit 24. In the embodiment illustrated on the left side in FIG. 10 the adjustment screw 36 penetrates the second part 22 completely and engages with its outer thread in an inner thread of a nut 54. In the embodiment illustrated on the right side in FIG. 10 the adjustment screw 36 not only has an outer thread, but at the end opposite to its head 39 a blind hole with an inner thread is provided, in which a lock screw 55 can be screwed in that penetrates the second part 22.

As already explained, the adjustment device 23 can comprise a plurality of adjustment units 24. For example, FIG. 9 illustrates exemplarily two adjustment units 24 that are arranged with distance to each other. If different forces for compression or lengthening of the first sleeve 25 at each adjustment unit 24 are applied and/or these forces are varied, the orientation or inclination of the two parts 21, 22 relative to each other can be modified. In doing so, the adjustment gap 41 can have different widths at different locations for example. The adjustment units can be configured identically or differently.

In the embodiments of the adjustment unit 24 explained so far by establishing the screw connection of the two parts 21, 22 by means of the adjustment screw 36 an adjustable pressing force between the abutment surface 28 and the counter-abutment surface 29 can be adjusted such that the first sleeve 25 and/or the second sleeve 30 are compressed in their axial directions and are thus shortened. In doing so, the relative position of the two parts 21, 22 at each adjustment unit 24 can be adjusted.

Figure 12:
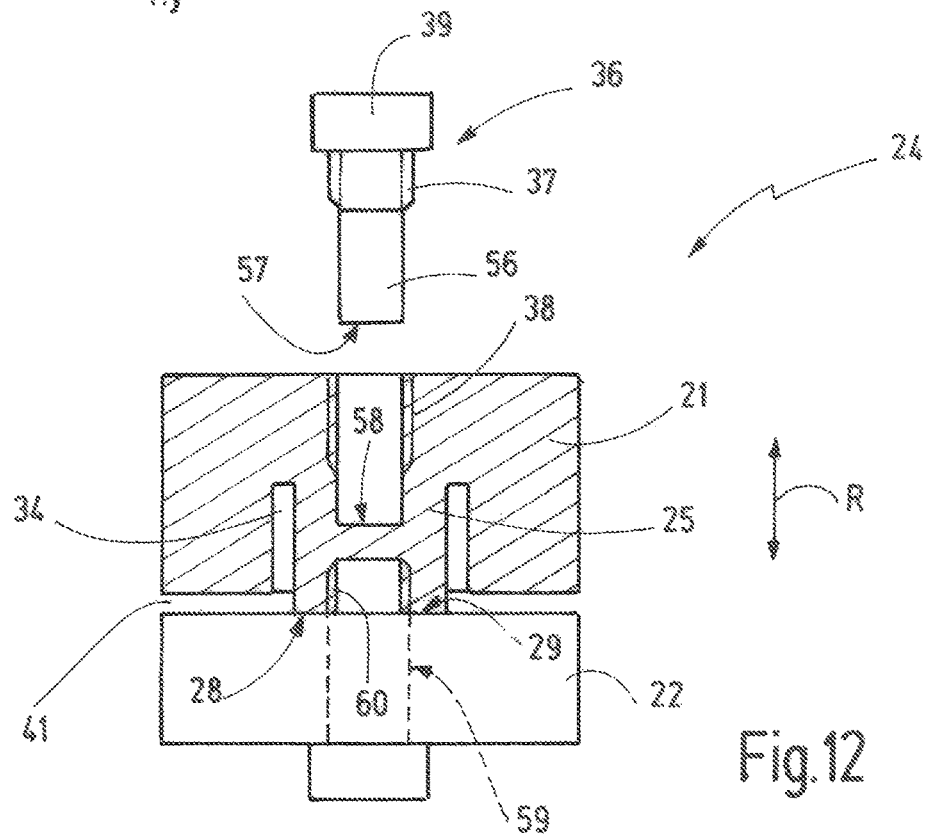

Alternatively to this it also possible to apply a force on the first sleeve 25 by means of the adjustment screw 36 in order to lengthen or to extend the first sleeve 25 in its axial extension along the axis A. In doing so, the axial length of the first sleeve can be increased compared with its non-engaged initial condition. An embodiment for this is illustrated in FIG. 12.

In this embodiment the adjustment screw comprises adjacent to its free end that is opposite to the head 39, a threadless section 56. A section with the outer thread 37 adjoins the threadless section 56. In the first part in adjustment direction R adjoining the first sleeve 25 the inner thread 38 is present, wherein the outer thread 37 of the adjustment screw 36 can be screwed in the inner thread 38. The end face of the free end of the adjustment screw 36 forms a stop surface 67. The first sleeve 25 comprises a counter-stop surface 58 in its interior that extends transverse to the adjustment direction R and preferably orthogonal to the adjustment direction R. In the screwed-in condition the stop surface 57 can be pressed against the counter-stop surface 58 in order to lengthen or stretch the sleeve 25. In doing so, the position of the abutment surface 28 can be varied in adjustment direction R.

Because the adjustment screw 36 does not extend through the first sleeve 25 in this embodiment, the adjustment unit 24 comprises a fastening screw 59 for fastening the second part 22 at the first part 21. On the side facing towards the second part 22, the first sleeve 25 comprises an inner thread cavity 60 surrounded by the abutment surface 28. The fastening screw 59 can penetrate the second part 22 and can be screwed in the inner thread cavity 60. Instead of the screw connection provided according to the example, the second part 22 can also be fastened at the first part 21 by other suitable fasteners by force fit and/or form fit and/or material bond.

In other embodiments, e.g. the embodiments according to FIGS. 1-10, the adjustment screw 36 is used in order to connect or fix the two parts 21, 22 with each other.

Figure 13:
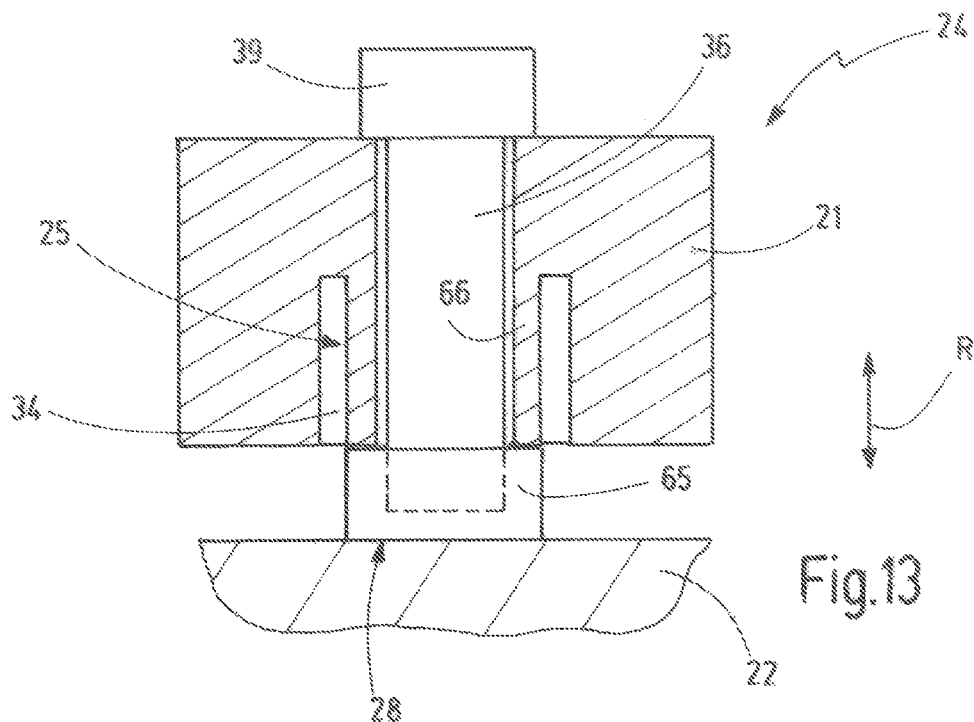
Figure 14:
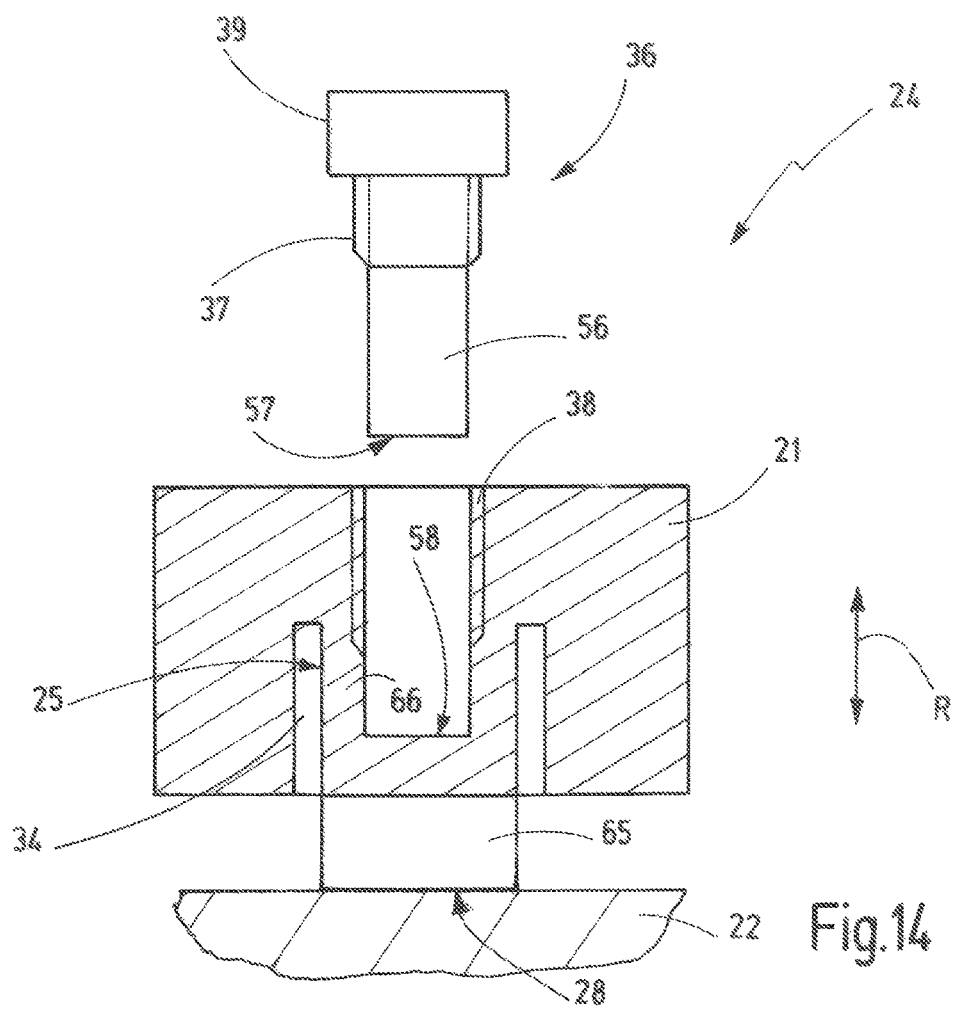

In FIGS. 13 and 14 additional embodiments of the adjustment unit 24 are schematically illustrated. In these embodiments the first part 21 and the second part 22 are loosely abutted at or on each other, e.g. at a friction bearing location. For example, the first part 21 can only rest on the second part 22 by its weight or vice versa. In these embodiments the first sleeve 25 is closed at its free sleeve end 27 by means of a friction body part 65. The abutment surface 28 is formed at the friction body part 65 of the first sleeve 25. The friction body part 65 can be an integral portion of the first sleeve 25 or fixed by force fit and/or form fit and/or material bond at an inner sleeve part 66. It is thus possible that the friction body part 65 is manufactured from another material than the inner sleeve part 66 or the first part 21 respectively. The inner sleeve part 66 is integrally configured with the first part 21 in the illustrated embodiments.

In the embodiment shown in FIG. 13 the friction body part 65 is fixed at the first part 21 by means of the adjustment screw 36 and is supported at the inner sleeve part 66. The inner sleeve part 66 can be compressed by applying a force between the head 39 of the adjustment screw 36 and the friction body part 65 that creates the compression. In doing so, the position of the abutment surface 28 can be varied and adjusted in adjustment direction R.

Different to this the embodiment according to FIG. 14 is corresponding to the embodiment according to FIG. 12 configured to lengthen the inner sleeve part 66 in adjustment direction R by means of the adjustment screw 36. For this the stop surface 57 can be pressed against the counter-stop surface 58 similar to the embodiment according to FIG. 12 in order to lengthen the inner sleeve part 66 and to modify the position of the abutment surface 28 in adjustment direction R. In this embodiment the friction body part 65 is material bond connected with the inner sleeve part 66, e.g. by gluing or welding or brazing.

Figure 15:
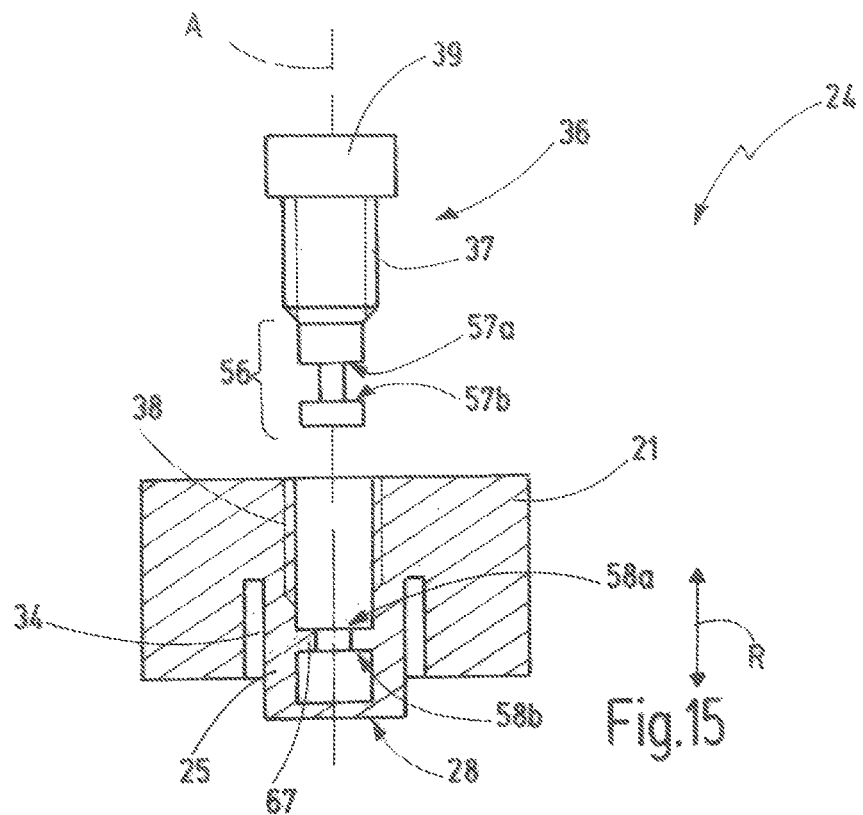
Figure 16:
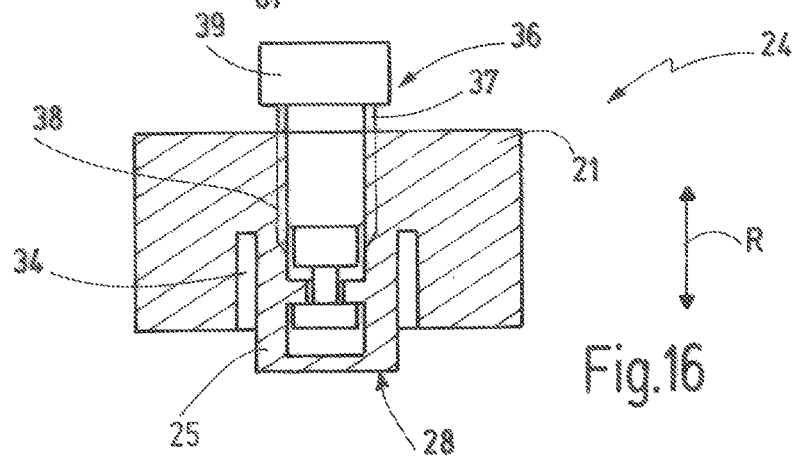
Figure 17:
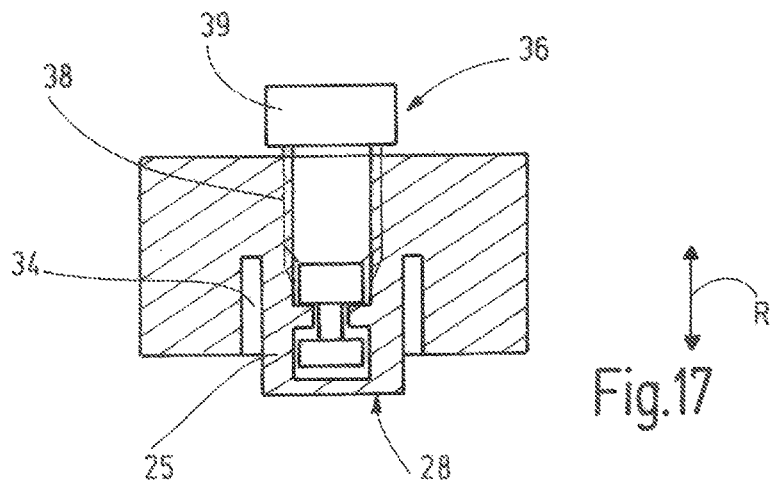

In FIGS. 15-17 another embodiment of the adjustment unit 24 is illustrated, wherein only the first part 21 with the first sleeve 25 is shown for sake of clarity. The second part 22 can be arranged or fixed at the first part 21 similar to the embodiment according to FIG. 12 or according to FIG. 14.

The embodiments according to FIGS. 15-17 are configured to either apply a force for compression of the first sleeve 25 or a force for stretching the first sleeve 25. For this the adjustment screw 36 comprises a first stop surface 57a and a second stop surface 57b arranged with distance opposite the first stop surface 57a. The two stop surfaces 57a, 57b are arranged in the threadless section 56 of the adjustment screw 36. The two stop surfaces face each other and are formed by means of a radial cut out in the threadless section 56.

The first sleeve 25 comprises in its interior a ring collar 67. Inclined and for example orthogonal to the axis A on one side of the ring collar 67, a first counter-stop surface 58a assigned to the first stop surface 57a and at the opposite side a second counter-stop surface 58b assigned to the second stop surface 57b are formed at the ring collar 67. The distance of the first stop surface 57a from the second stop surface 57b along the axis A or in adjustment direction R is larger than the distance between the first counter-stop surface 58a and the second counter-stop surface 58b along the axis A or in adjustment direction R. The second counter-stop surface 58b faces away from the first counter-stop surface 58a. In FIG. 15 an exploded view of the adjustment unit 24 is illustrated. In FIGS. 16 and 17 the adjustment unit 24 is shown in different conditions. In the condition shown in FIG. 16 the second stop surface 57b is in abutment with the second counter-stop surface 58a and applies a force on the first sleeve 25 in order to compress the first sleeve 25 at least in a section. Different to this in the condition according to FIG. 17, the first stop surface 57a is in abutment with the first counter-stop surface 58a, in order to stretch the sleeve 25 at least in a section. Thus, the axial length of the first sleeve 25 can be shortened (FIG. 16) or elongated (FIG. 17) in adjustment direction R in this embodiment.

Figure 18:
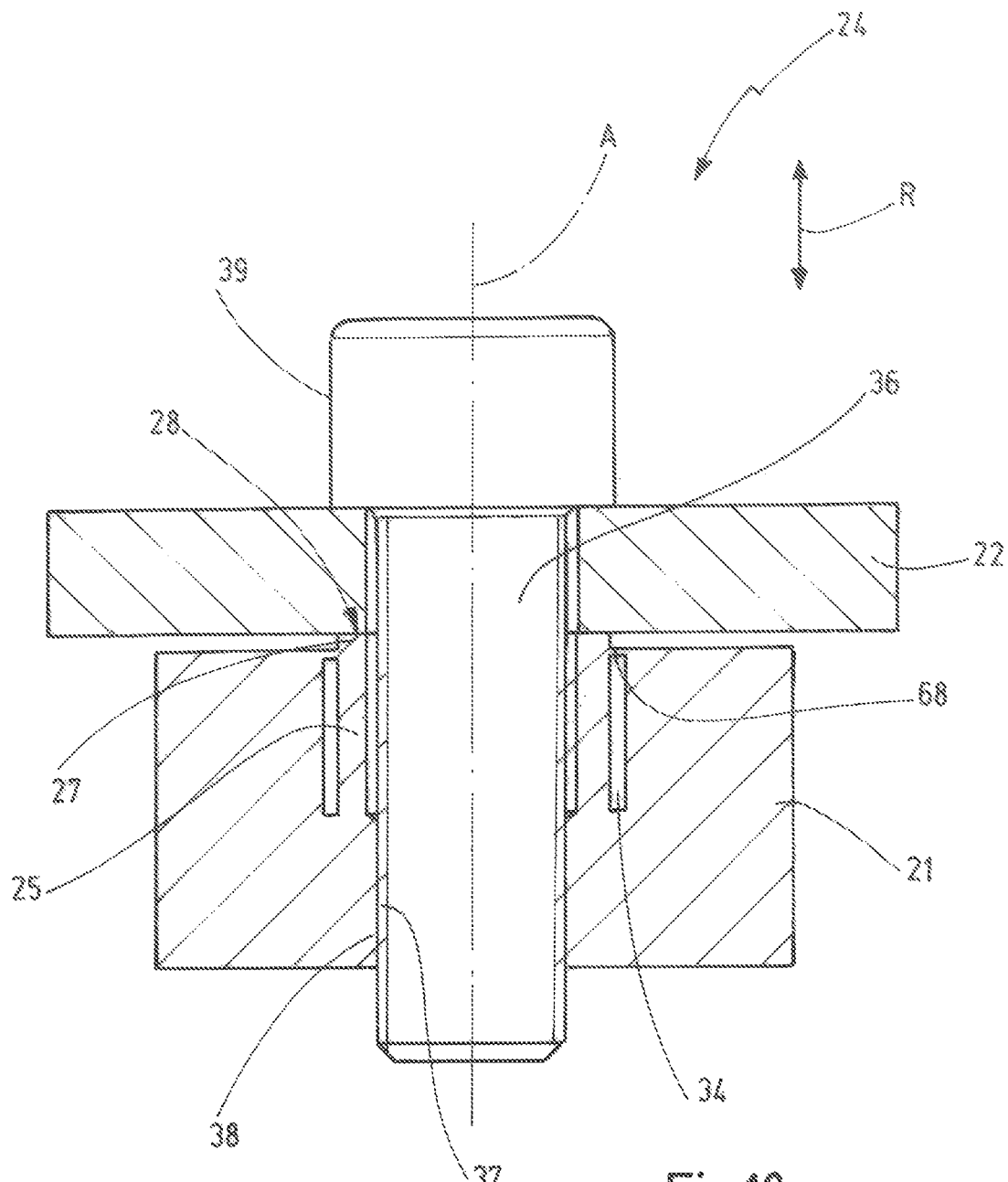

In FIG. 18 a further embodiment for an adjustment unit 24 is illustrated. Different to the embodiment according to FIG. 1 the clearance 34 is covered or closed to the free sleeve end 27 of the first sleeve 25 by means of a connection layer 68. In the embodiments the side of the connection layer 68 facing away from the clearance 34, transitions without step and/or without edges into the surface of the first part 21 facing the second part 22. In another embodiment the connection layer 68 could also be arranged at any other axial location with reference to the axis A and could separate the clearance 34 in two sectional spaces so to speak.

The connection layer can be configured thin, like a membrane. The thickness of the connection layer 68 with view in axial direction or in adjustment direction R is smaller than the radial width of the first sleeve 25, particularly at least about the factor 2-5 smaller. By means of this connection layer 68 the minimum radial rigidity of the support of the first sleeve 25 can be defined or adjusted.

In the embodiment shown in FIG. 18 the connection layer 68 is formed completely ring-shaped in circumferential direction about the axis A and thus closes the clearance 34 completely. Different to this the connection layer 68 could also comprise one or more openings and/or through holes. Two or more separate connection layers 68 can also be present that are separated or arranged with distance to each other in axial direction or adjustment direction R and/or in circumferential direction about the axis A. By means of the at least one connection layer 68 the clearance 34 can be completely or partly closed.

All embodiments of the adjustment unit 24 can be used in an adjustment device 23 in any arbitrary combination. Apart from the embodiments shown in FIGS. 13 and 14, the first sleeve 25 is integrally manufactured in all other embodiments. If the adjustment unit 24 comprises a second sleeve 30 additionally to the first sleeve 25, it can be configured similar to the described configurations of the first sleeve 25. In some embodiments of the adjustment unit 24 the adjustment screw 36 is also used to connect the two parts 21, 22 with each other. Also embodiments exist in which a separate fastener is used. The separate fastener can form a part of the adjustment unit 24. In other embodiments the fastener for connecting the first part 21 with the second part 22 can be provided separately and independent from the at least one adjustment unit 24.

An exemplary configuration of an arrangement 20 with an adjustment device 23 is illustrated in FIG. 11. In this embodiment the adjustment device 23 has four adjustment units: A first adjustment unit 24a, a second adjustment unit 24b, a third adjustment unit 24c and a fourth adjustment unit 24d. The first adjustment unit 24a, the second adjustment unit 24b and the third adjustment unit 24c act in a first adjustment direction Rx, whereas the fourth adjustment unit 24d acts in a second adjustment direction Ry. In general the adjustment device 23 can have one or more adjustment units 24 for each direction in the space or each adjustment direction Rx, Ry, Rz of a Cartesian coordinate system.

The first adjustment unit 24a and the second adjustment unit 24b commonly define a first tilting axis K1. By adjusting the third adjustment unit 24c or the effective sleeve length of the first sleeve 25 of the third adjustment unit 24c, a tilting or pivoting of the first part 21 about the first tilting axis K1 relative to the second part 22 can be achieved.

Analog to this the second adjustment unit 24b and the third adjustment unit 24c define a second tilting axis K2. By adjusting the effective sleeve length of the first sleeve 25 of the first adjustment unit 24a, a tilting or pivoting of the first part 21 about the second tilting axis K2 relative to the second part 22 can be carried out.

A tilting axis cannot only be defined by positioning two adjustment units along a straight line that forms the tilting axis. As schematically illustrated in FIG. 11, the first adjustment unit 24a defines a third tilting axis K3. The third tilting axis K3 is at least in part defined by arranging a pair of support parts 35 that are arranged opposite to each other along a straight line orthogonal to the first adjustment direction Rx diametrically relative to the axis A of the first sleeve 25 and in doing so at least contribute to the definition of the third tilting axis K3. By uniformly setting or adjusting of the second adjustment unit 24b and the third adjustment unit 24c, a pivot movement or tilting movement of the first part 21 about the third tilting axis K3 relative to the second part 22 can be effectuated.

As it is schematically illustrated in FIG. 11, the arrangement 20 comprises also the fourth adjustment unit 24d that acts in a different, second adjustment direction Ry that is orientated orthogonal to the first adjustment direction Rx different to the other three adjustment unit 24a, 24b, 24c. If the effective length of the first sleeve 25 of the fourth adjustment unit 24d is modified, a rotating movement of the first part 21 relative to the second part 22 can be initiated, as it is schematically illustrated by arrow P in FIG. 11. The rotation movement is possible, because the first adjustment unit 24a, the second adjustment unit 24b and the third adjustment unit 24c have a sufficiently low bearing rigidity radial to the first adjustment direction Rx. This can be achieved by sufficiently large clearances 34 positioned in circumferential direction about the respective axis A. As it is schematically shown in FIG. 11, the number of clearances 34 and the number of support parts 35 can be different in each present adjustment unit 24 of a common adjustment device 23. Also the orientation of the clearances 34 or the support parts 35 about the respective axis A can be selected differently in the individual adjustment units 24 respectively, even though the number and dimension of the clearances 34 or support parts 35 is equally selected (compare second adjustment unit 24b and third adjustment unit 24c in FIG. 11).

The invention refers to an arrangement 20 comprising a first part 21, a second part 22 and an adjustment device 23. The adjustment device 23 is configured for adjustment of the relative position between the first part 21 and the second part 22 and can optionally concurrently create a connection between the first part 21 and the second part 22. The adjustment device 23 comprises at least one adjustment unit 24. Each provided adjustment unit 24 has one first sleeve 25 extending in a respective adjustment direction R that is connected with the first part 21. At a free sleeve end 27 of the first sleeve 25 an abutment surface 28 is provided. The first sleeve 25 can be integrally formed in one piece or from several individual parts. The first sleeve 25 is arranged in a part cavity 26 of the first part 21 and comprises at least one clearance 34 extending in circumferential direction between the first part 21 and the first sleeve 25. Adjacent to the at least one clearance 34 at least one support part 35 is provided by means of which the first sleeve 25 is supported at the first part 21 radially to the adjustment direction R. By means of an adjustment screw 36 of the adjustment unit 24 a force can be applied to the first sleeve 25 in order to lengthen or compress it in the respective adjustment direction R.

LIST OF REFERENCE SIGNS 20 arrangement
21 first part
22 second part
23 adjustment device
24 adjustment unit
24a first adjustment unit
24b second adjustment unit
24c third adjustment unit
24d fourth adjustment unit
25 first sleeve
26 first part cavity
27 free sleeve end
28 abutment surface
29 counter-abutment surface
30 second sleeve
34 clearance
35 support part
36 adjustment screw
37 outer thread
38 inner thread
39 head
40 through hole
41 adjustment gap
42 reception cavity
46 second part cavity
47 threaded sleeve
48 sleeve outer thread
49 screw-in thread
50 unit
54 nut
55 locking screw
56 threadless section
57 stop surface
57a first stop surface
57b second stop surface
58 counter-stop surface
58a first counter-stop surface
58b second counter-stop surface
59 fastening screw
60 inner thread cavity
65 friction body part
66 inner sleeve part
67 ring collar
68 connection layer
A axis
F force flow
K1 first tilting axis
K2 second tilting axis
K3 third tilting axis
P arrow
R adjustment direction
Rx first adjustment direction
Ry second adjustment direction

The invention claimed is:

1. Arrangement (20) comprising a first part (21), a second part (22) and an adjustment device (23) for adjustment of a relative position between the first part (21) and the second part (22), wherein the adjustment device (23) comprises at least one adjustment unit (24) and wherein each adjustment unit (24) comprises:
   a first sleeve (25) extending axially in an individual adjustment direction (R),
   the first sleeve (25) being connected with the first part (21), and
   the first sleeve (25) comprising an abutment surface (28) at an axially free sleeve end (27) at which the second part (22) abuts directly or indirectly,
   wherein at least one clearance (34) is defined between the first sleeve (25) and the first part (21) in a circumferential section radially outward of and at least partially about the first sleeve (25), the at least one clearance (34) being directly open towards and facing the second part (22),
   at least one support part (35) disposed to extend radial to the individual adjustment direction (R) and fully between the first sleeve (25) and at the first part (21) through the at least one clearance (34), the at least one support part (35) being configured to limit the at least one clearance (34) in a circumferential direction around the first sleeve (25) and support the first sleeve (25), and
   an adjustment screw (36) extending axially in the individual adjustment direction (R) and at least partly engaging in the first sleeve (25) and is configured to apply an adjustable force on the first sleeve (25) to lengthen or compress the first sleeve (25) in the individual adjustment direction (R) to effect a change in the relative position between the first part (21) and the second part (22),
   wherein between the first part (21) and the second part (22) at least in the individual adjustment direction (R) of the at least one adjustment unit (24) an adjustment gap (41) is provided and that the at least one adjustment unit (24) is configured to modify the adjustment gap (41).

2. Arrangement according to claim 1, wherein the at least one clearance (34) is open toward the axially free sleeve end (27).

3. Arrangement according to claim 1, wherein the at least one clearance (34) is at least partly closed toward the axially free sleeve end (27).

4. Arrangement according to claim 1, wherein the first part (21) and the second part (22) do not abut directly at each other in the individual adjustment direction (R).

5. Arrangement according to claim 1, wherein the at least one support part further comprises a plurality of support parts (35).

6. Arrangement according to claim 1, wherein the adjustment device (23) comprises at least three of the at least one adjustment units (24) arranged in one common adjustment direction (R) that are not arranged along one single straight line having a direction radial to the one common adjustment direction (R).

7. Arrangement according to claim 6, wherein one or two of the at least three adjustment units (24) define a tilting axis (K1, K2, K3).

8. Arrangement according to claim 7, wherein the tilting axis (K3) for at least one of the at least three adjustment units (24) is located along the at least one support part (35) around the first sleeve (25) of the at least one of the at least three adjustment units (24).

9. Arrangement according to claim 7, wherein the tilting axis (K1, K2) is defined by positions of two of the at least three adjustment units (24).

10. Arrangement according to claim 1, wherein the first sleeve (25) is integrally formed with the first part (21) and is configured to deform in a radial outward expansion into the at least one clearance (34) in response to compression caused by the adjustment screw (36).

11. Arrangement according to claim 1, wherein the first sleeve (25) is connected with the first part (21) by one or any combination of a form fit, force fit, material bond connection and is configured to deform in a radial outward expansion into the at least one clearance (34) in response to compression caused by the adjustment screw (36).

12. Arrangement according to claim 1, further comprising a counter-abutment surface (29) is provided at the second part (22) that directly abuts at the abutment surface (28).

13. Arrangement according to claim 1 wherein the at least one adjustment unit (24) comprises a second sleeve (30) extending axially in the individual adjustment direction (R) and fixed to the second part (22) that comprises a counter-abutment surface (29) at an axial free sleeve end that directly abuts at the abutment surface (28) of the first sleeve (25) of the at least one adjustment unit (24).

14. Arrangement according to claim 1, wherein the adjustment screw (36) comprises an outer thread (37).

15. Arrangement according to claim 14, wherein the adjustment screw (36) is supported with a head (39) at one of the first part (21) or the second part (22) and wherein the outer thread engages (37) in an inner thread (38) at an other of the second part (22) or the first part (21) or in an inner thread of a nut (54) that is supported at the other of the second part (22) or the first part (21).

16. Arrangement according to claim 14, wherein the adjustment screw 36 is configured to engage with its outer thread (37) in an inner thread (38) at the first p art (21) and to press with a stop surface (57) that is oriented inclined or orthogonal to the individual adjustment direction (R) against a counter-stop surface (58) provided at the first sleeve (25).

17. Arrangement according to claim 16, wherein the adjustment screw (36) comprises two stop surfaces (57a, 57b) opposed with distance to each other, each of which is assigned a counter-stop surface (58a, 58b) at the first sleeve (25), wherein the distance of the two stop surfaces (57a, 57b) in the individual adjustment direction (R) is larger than a distance between the counter-stop surfaces (58a, 58b).

18. Arrangement according to claim 1, wherein the first part (21) and the second part (22) loosely rest against each other.

19. Arrangement according to claim 1, wherein the first sleeve (25) comprises a friction body part (65) at its free sleeve end (27), wherein the abutment surface (28) is provided at the friction body part (65) of the first sleeve (25).

20. Arrangement according to claim 19, wherein the friction body part (65) is fixed at the first part (21) by the adjustment screw (36) and is supported at an inner sleeve part (66) of the first sleeve (25) that can be compressed by the adjustment screw (36).

* * * * *